(12) United States Patent
Macor

(10) Patent No.: US 6,948,869 B2
(45) Date of Patent: Sep. 27, 2005

(54) COMPACT ERGONOMIC TELEPHONY KEYPAD

(75) Inventor: James J. Macor, Jackson, NJ (US)

(73) Assignee: Proprietary Technologies, Inc., Hunterdon County, NJ (US)

( * ) Notice: Subject to any disclaimer, the term of this patent is extended or adjusted under 35 U.S.C. 154(b) by 0 days.

(21) Appl. No.: 10/751,084

(22) Filed: Jan. 2, 2004

(65) Prior Publication Data
US 2005/0147447 A1   Jul. 7, 2005

(51) Int. Cl.[7] .................................................. B41J 5/10
(52) U.S. Cl. ...................................... 400/485; 400/472
(58) Field of Search .............................. 400/485, 489, 400/472; 361/680; 341/22, 21; 345/168–171

(56) References Cited
U.S. PATENT DOCUMENTS 5,359,658 A * 10/1994 Goodson ..................... 379/447
5,861,823 A * 1/1999 Strauch et al. ................. 341/22
6,144,732 A * 11/2000 Jauregui et al. ............. 379/368
6,377,685 B1 * 4/2002 Krishnan ................ 379/433.07
2003/0121964 A1 * 7/2003 Crisan ....................... 235/60 R
2003/0161672 A1 * 8/2003 Roberson ................... 400/490
2003/0235452 A1 * 12/2003 Kraus et al. ................ 400/472

* cited by examiner

Primary Examiner—Anthony H. Nguyen

(57) ABSTRACT

A compact, ergonomic telephony keypad is described which comprises three principle buttons capable of performing twelve distinct electronic switch operations. The three principle buttons are positioned in a group comprising a telephony keypad with each button formed for tactile manipulation to achieve four of the twelve switch operations. Each button also has four tactile depressible areas positioned thereon around an imaginary central axis. The four tactile depressible areas are spaced about equally apart around the imaginary central axis of each of the principle buttons. And, the three principle buttons are spaced apart and positioned relative to each other so as to substantially maximize the spacing of the twelve depressible areas, while, substantially minimizing the spacing of the principle buttons.

11 Claims, 5 Drawing Sheets

FIG. 10
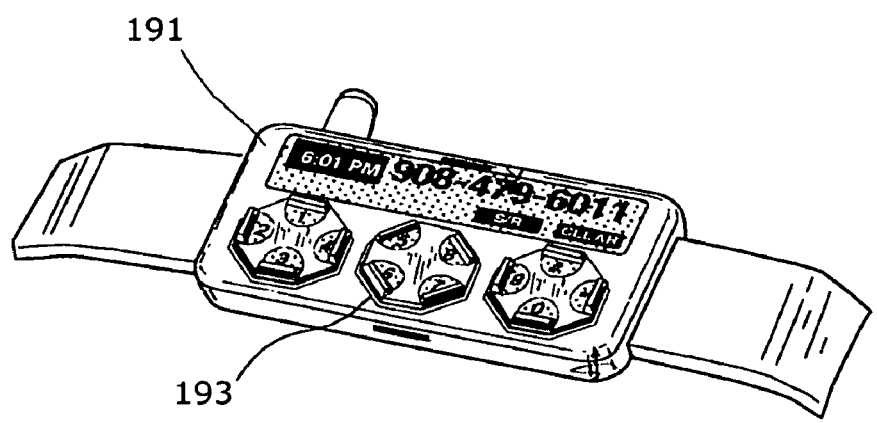
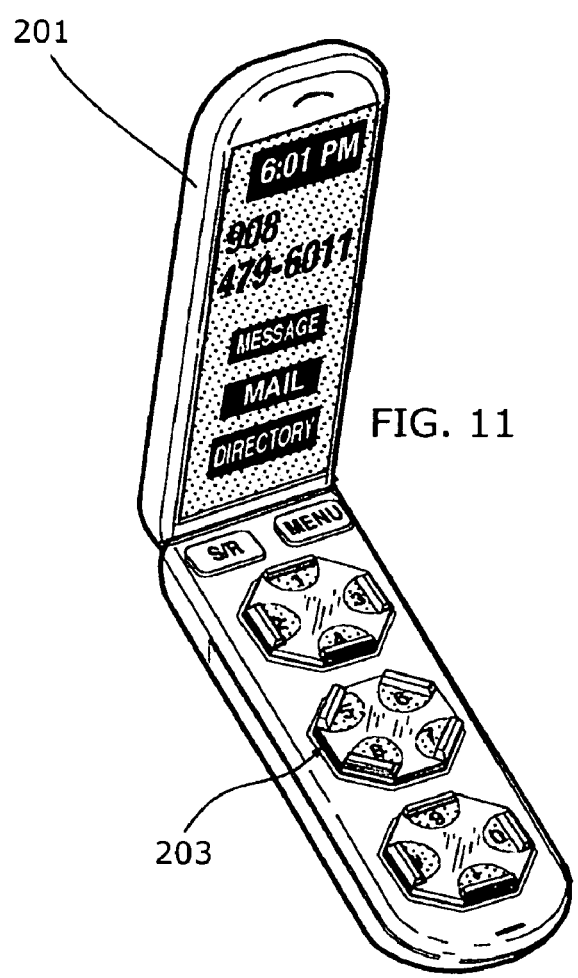
FIG. 11

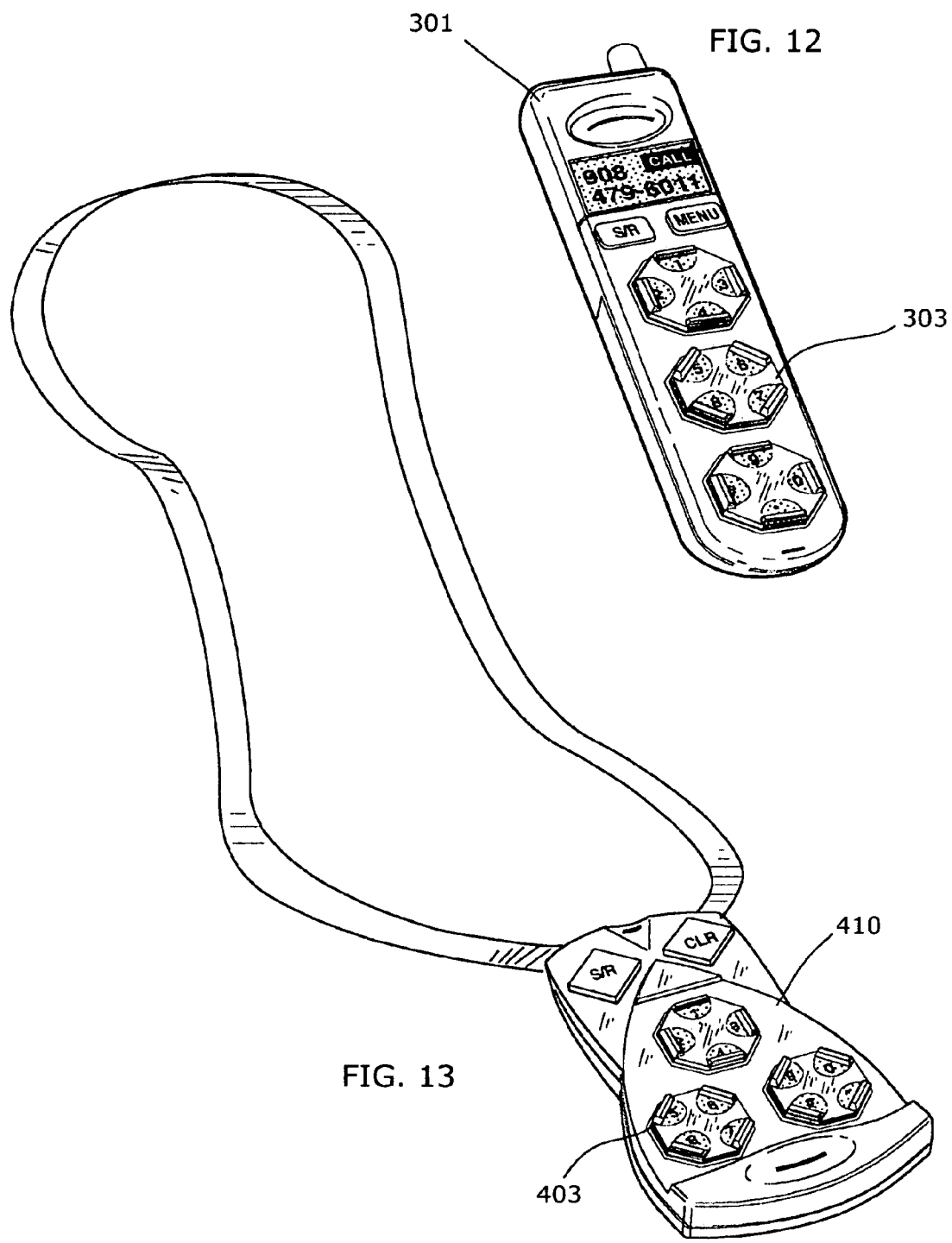

US 6,948,869 B2

COMPACT ERGONOMIC TELEPHONY KEYPAD

FIELD OF THE INVENTION

The present invention relates to portable telecommunication devices such as cellular phones or messaging devices or combinations thereof.

BACKGROUND OF THE INVENTION

As telecommunication devices become smaller for improved portability, ergonomic problems arise with the smaller devices for the miniaturization of the user interface means, for example the buttons of a keypad. In particular the size of a keypad for dialing phone numbers is a major limiting factor in the miniaturization of portable telephony devices. As the industry moves towards smaller devices for enhanced portability, there has been a trend towards miniaturization of the traditional twelve button keypad and alternate dialing methods utilizing scrolling wheels, cursors, trackballs and virtual keypads. Applicant believes all of these methods present ergonomic and/or performance drawbacks.

SUMMARY OF THE INVENTION

The present invention involves a compact, ergonomic telephony keypad which comprises three principle buttons capable of performing twelve distinct electronic switch operations. The three principle buttons are positioned in a group comprising a telephony keypad with each button formed for tactile manipulation to achieve four of the twelve switch operations. Each button also has four tactile depressible areas positioned thereon around an imaginary central axis. The four tactile depressible areas are spaced about equally apart around the imaginary central axis of each of the principle buttons. And, the three principle buttons are spaced apart and positioned relative to each other so as to substantially maximize the spacing of the twelve depressible areas, while, substantially minimizing the spacing of the principle buttons.

Recognizing the need to develop a smaller, user friendly telephony keypad, the following objectives are considered.

It is an important objective of the present invention to provide for a smaller telephony device, thereby providing the user with greater portability.

It is another important objective of the present invention to provide for a smaller telephony keypad, so as to provide for a smaller telephony device.

It is another important objective of the present invention to provide for a telephony keypad that provides the user with tactile and touch sensitive switch operations for enhanced ergonomics.

It is another important objective of the present invention to provide for optimum spacing and precision operation of the tactile buttons and switch operations.

It is another important objective of the present invention to provide for visual association by using strategically placed graphics to aid the user with individual switch operations.

It is another important objective of the present invention that it be commercially viable, simple in design, and cost efficient to manufacture.

BRIEF DESCRIPTION OF THE DRAWINGS

FIG. 10 shows a perspective view of a wrist mountable telephony device comprising an embodiment of the present invention, a compact ergonomic telephony keypad.

FIG. 11 shows a perspective view of handheld telephony device comprising an embodiment of the present invention, a compact ergonomic telephony keypad.

FIG. 12 shows a perspective view of another handheld telephony device comprising an embodiment of the present invention, a compact ergonomic telephony keypad.

FIG. 13 shows a perspective view of another telephony device comprising an embodiment of the present invention, a compact ergonomic telephony keypad.

DETAILED DESCRIPTION OF THE DRAWINGS

Figure 1:
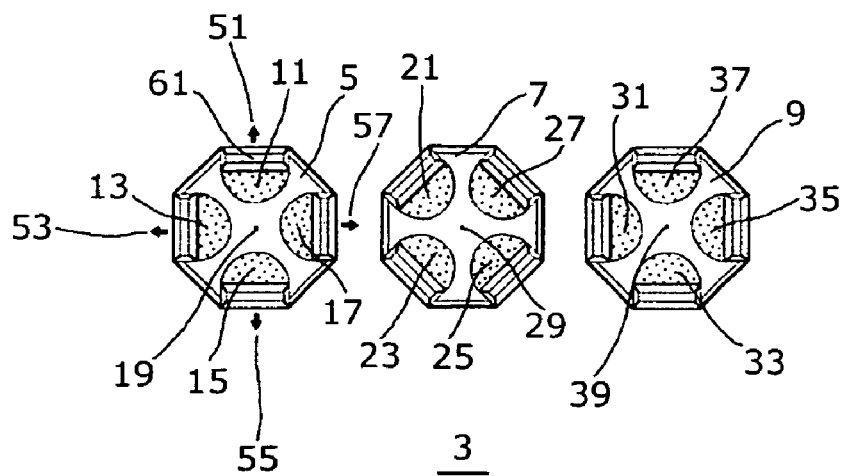
FIG. 1 shows a top view of an embodiment of the present invention comprising a group of three buttons in a line with similar button orientation.

Referring now to the drawings which are for the purpose of illustrating preferred embodiments of the present invention and not for the purpose of limiting same, FIG. 1 shows a top view of an embodiment of the present invention comprising a group of three buttons positioned in a line with similar button orientation. There is shown a compact, ergonomic telephony keypad 3 comprising three principle buttons 5, 7 and 9 together capable of performing twelve distinct electronic switch operations. The three principle buttons 5, 7 and 9 are positioned in a group upon telephony keypad 3 with each button formed for tactile manipulation to achieve four of the twelve switch operations. Each button is further formed having four tactile depressible areas positioned thereon around an imaginary central axis. Button 5 has four depressible areas 11, 13, 15 and 17 positioned around imaginary central axis 19 as shown. The four tactile depressible areas 11, 13, 15 and 17 are spaced about equally apart around imaginary central axis 19 of principle button 5. Button 7 has four depressible areas 21, 23, 25 and 27 positioned around imaginary central axis 29 as shown. The four tactile depressible areas 21, 23, 25 and 27 are spaced about equally apart around imaginary central axis 29 of principle button 7. Button 9 has four depressible areas 31, 33, 35 and 37 positioned around imaginary central axis 39 as shown. The four tactile depressible areas 31, 33, 35 and 37 are spaced about equally apart around imaginary central axis 39 of principle button 9. The three principle buttons 5, 7 and 9 of telephony keypad 3 are spaced apart and positioned relative to each other so as to maximize the spacing of the twelve depressible areas, while, minimizing the distance between the principle buttons. In other words, the spacing distance between two adjacent depressible areas of a single button, is about the same as the spacing distance between a depressible area of one button to an adjacent depressible area of another adjacent button. However, the spacing distance between two adjacent depressible areas of a single button, may be slightly more than or slightly less than the spacing distance between a depressible area of one button to an adjacent depressible area of another adjacent button. In preferred embodiments, the spacing is about the same. For example the spacing distance between depressible areas 31 and 33 of button 9 is about the same as, the spacing distance between depressible area 31 of button 9 to adjacent depressible area 29 of adjacent button 7. Preferred embodiments of the present invention may have each principle button formed for tiltable operation in four different directions. For example, principle button 5 is tiltable in four different directions 51, 53, 55 and 57 away from the imaginary central axis 19 as shown. Another novel feature of preferred embodiments of the present invention is that each principle button may be formed having a periphery, and each depressible area is positioned proximate or close to the periphery as shown in this FIG. 1. Another novel feature of preferred embodiments of the present invention is that each depressible area of each button may be structurally raised to aid a user with tactile manipulation. For example, depressible area 11 of button 5 has structurally raised feature 61 as shown and is representative of all other depressible areas of keypad 3. And, yet another novel feature of preferred embodiments of the present invention is that each primary button may have a predetermined geometric shape with a predetermined number of sides, and the number of sides may be divisible by four using whole numbers. It can be seen that each principle button 5, 7 and 9 of keypad 3 has an octagonal shape with a number of sides divisible by four using whole numbers.

Figure 2:
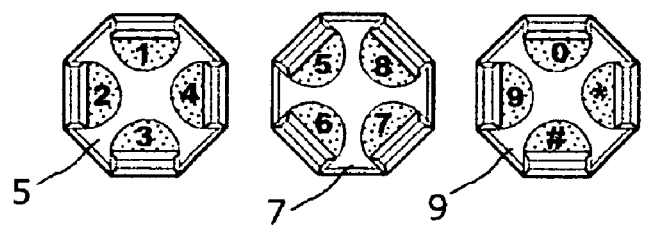
FIG. 2 shows a top view of the present invention shown in FIG. 1 also including graphic identification for the twelve switch operations.

FIG. 2 shows a top view of the present invention shown in FIG. 1 also including graphic identification for the twelve switch operations. The principle buttons 5, 7 and 9 are each capable of performing four distinct switch operations as described above, and therefore, each principle button is marked with four distinct graphic identification markings as shown. Accordingly principle buttons 5, 7 and 9 together include twelve different identification markings as shown so that a user may select twelve different switch operations.

Figure 3:
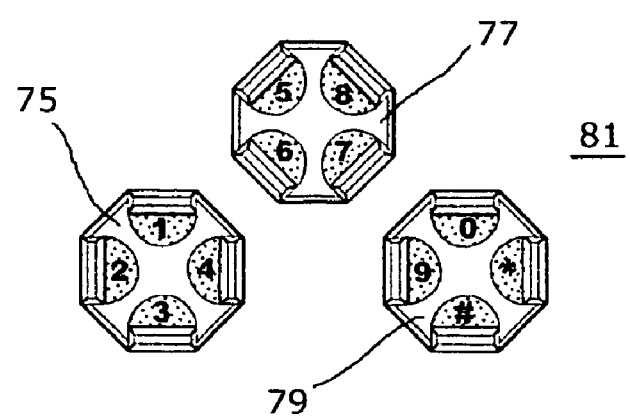
FIG. 3 shows a top view of another embodiment of the present invention comprising a group of three buttons not in a line with similar button orientation.

FIG. 3 shows a top view of another embodiment of the present invention comprising a group of three buttons not in a line with similar button orientation. In this embodiment, three principle buttons 75, 77 and 79 are positioned not in line upon keypad 81. Principle buttons 75, 77 and 79 are further positioned with similar button orientation (based upon button shape) as shown. The present invention may include three buttons that are positioned in a line relative to each other, or not in a line relative to each other. The buttons may be positioned with the same orientation (relative to the outer shape of each button) or with dissimilar orientation.

Figure 4:
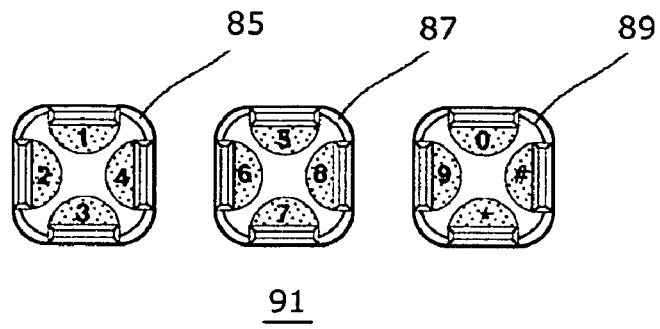
FIG. 4 shows a top view of another embodiment of the present invention comprising a group of three buttons in a line with similar button orientation.

FIG. 4 shows a top view of another embodiment of the present invention comprising a group of three buttons in a line with similar button orientation. In this embodiment, three principle buttons 85, 87 and 89 are positioned in a line upon keypad 91. Principle buttons 85, 87 and 89 are further positioned with similar button orientation (based upon button shape) as shown.

Figure 5:
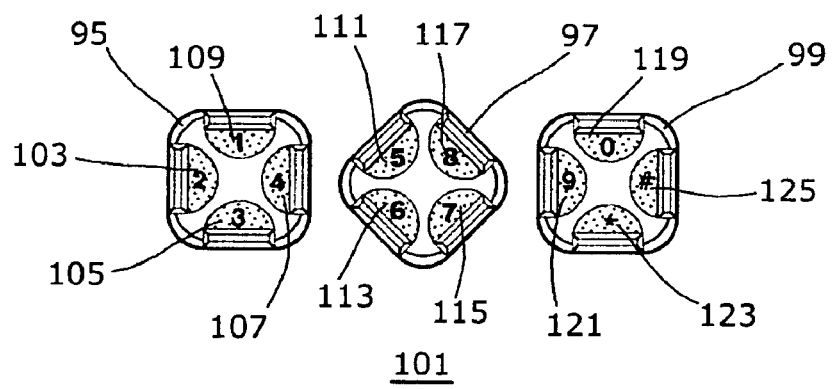
FIG. 5 shows a top view of another embodiment of the present invention comprising a group of three buttons in a line with dissimilar button orientation.

FIG. 5 shows a top view of another embodiment of the present invention comprising a group of three buttons in a line with different button orientation. In this preferred embodiment of the present invention, three principle buttons 95, 97 and 99 are positioned in a line upon keypad 101. Principle buttons 95, 97 and 99 are further positioned with dissimilar button orientation (based upon button shape) as shown. The present invention may include three buttons that are positioned in a line relative to each other, or not in a line relative to each other. The buttons may be positioned with the same orientation (relative to the outer shape of each button) or with dissimilar orientation as shown. In addition, the three principle buttons 95, 97 and 99 of telephony keypad 101 are spaced apart and positioned relative to each other so as to maximize the spacing of the twelve depressible areas 103, 105, 107, 109, 111, 113, 115, 117, 119, 121, 123 and 125 as shown, while, minimizing the distance between the principle buttons. In preferred embodiments of the present invention, the spacing distance between two adjacent depressible areas of a single button, is about the same as the spacing distance between a depressible area of one button to an adjacent depressible area of another adjacent button. However, the spacing distance between two adjacent depressible areas of a single button, may be slightly more than or slightly less than the spacing distance between a depressible area of one button to an adjacent depressible area of another adjacent button. In preferred embodiments, the spacing is about the same.

Figure 6:
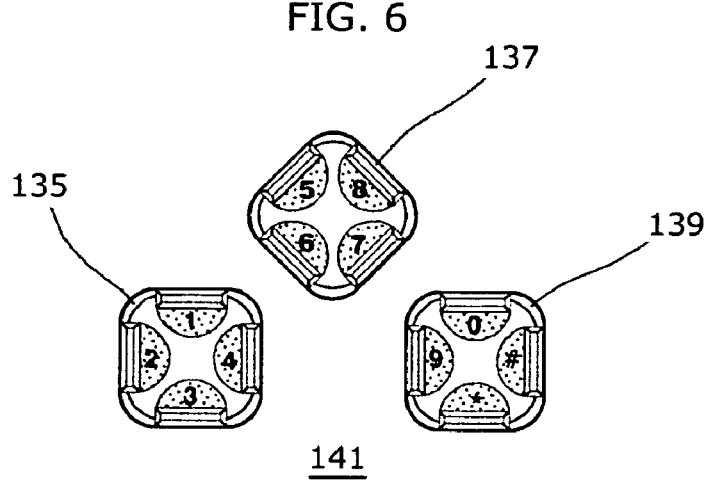
FIG. 6 shows a top view of another embodiment of the present invention comprising a group of three buttons not in a line with dissimilar button orientation.

FIG. 6 shows a top view of another embodiment of the present invention comprising a group of three buttons not in a line with dissimilar button orientation. In this embodiment, three principle buttons 135, 137 and 139 are not positioned in a line upon keypad 141. Principle buttons 135, 137 and 139 are further positioned with dissimilar button orientation (based upon button shape) as shown.

Figure 7:
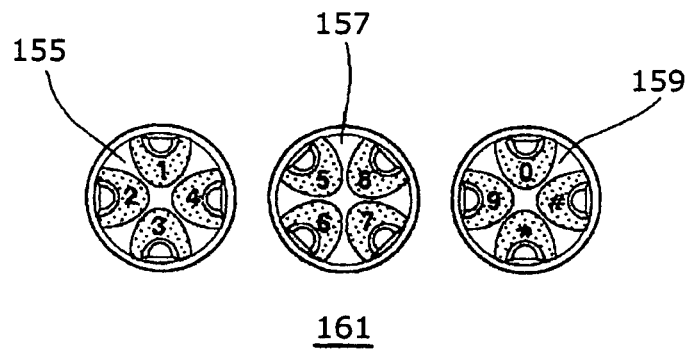
FIG. 7 shows a top view of another embodiment of the present invention comprising a group of three buttons in a line with similar button orientation.

FIG. 7 shows a top view of another embodiment of the present invention comprising a group of three buttons in a line with similar button orientation. In this embodiment, three principle buttons 155, 157 and 159 are positioned in line upon keypad 161. Principle buttons 155, 157 and 159 are further positioned with similar button orientation (based upon button shape) as shown.

Figure 8:
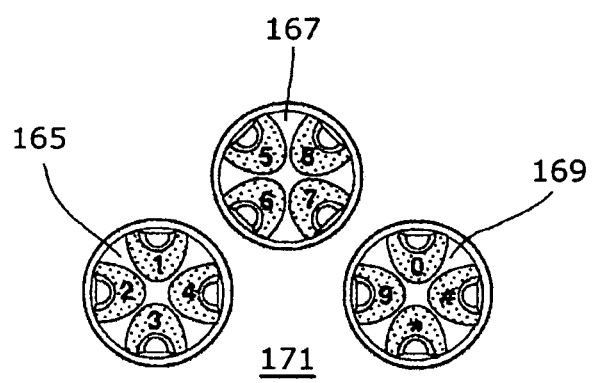
FIG. 8 shows a top view of another embodiment of the present invention comprising a group of three buttons not in a line with similar button orientation.

FIG. 8 shows a top view of another embodiment of the present invention comprising a group of three buttons not in a line with similar button orientation. In this embodiment, three principle buttons 165, 167 and 169 are positioned not in line upon keypad 171. Principle buttons 165, 167 and 169 are further positioned with similar button orientation (based upon button shape) as shown.

Figure 9:
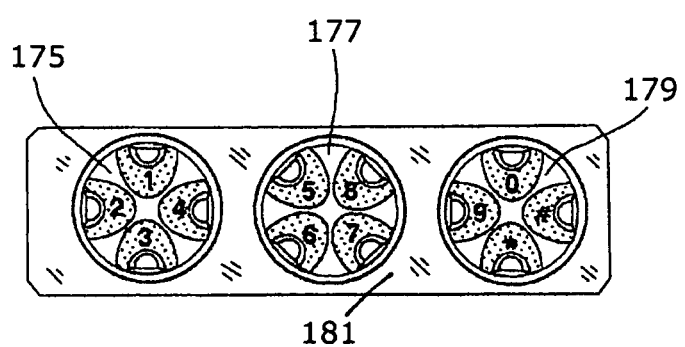
FIG. 9 shows a top view of another embodiment of the present invention comprising an overlay having three buttons in a line with similar button orientation.

FIG. 9 shows a top view of another embodiment of the present invention comprising an overlay formed having three buttons in a line with similar button orientation. In this embodiment, three principle buttons 175, 177 and 179 are each formed as an integral part of an overlay keypad 181. Keypad overlay 181 is formed and/or molded using a resilient overlay material appropriate for the application involving three principle buttons capable of performing twelve distinct electronic switch operations.

FIG. 10 shows a perspective view of a wrist mountable telephony device 191 comprising an embodiment of the present invention, a compact ergonomic telephony keypad 193.

FIG. 11 shows a perspective view of handheld telephony device 201 comprising an embodiment of the present invention, a compact ergonomic telephony keypad 203.

FIG. 12 shows a perspective view of another handheld telephony device 301 comprising an embodiment of the present invention, a compact ergonomic telephony keypad 303.

FIG. 13 shows a perspective view of another telephony device 410 comprising an embodiment of the present invention, a compact ergonomic telephony keypad 403.

Upon reading and understanding the specification of the present invention described above, modifications and alterations will become apparent to those skilled in the art. It is intended that all such modifications and alterations be included insofar as they come within the scope of the patent as claimed or the equivalence thereof.

Having thus described the invention, the following is claimed:

1. A compact, ergonomic telephony keypad comprising three principle buttons capable of performing twelve distinct electronic switch operations; said three principle buttons being positioned in a group comprising a telephony keypad with each said button formed for tactile manipulation to achieve four of said twelve switch operations, each said button further being formed having four tactile depressible areas positioned thereon around an imaginary central axis, said four tactile depressible areas being spaced about equally apart around the imaginary central axis of each of said principle buttons, and, the depressible areas of each said button being positionally rotated about 45 degrees relative to the positioning of the depressible areas of an adjacent button.

2. A telephony keypad of claim 1, wherein each said principle button is formed being tiltable in four different directions away from said imaginary central axis.

3. A telephony keypad of claim 1, wherein the spacing distance between two adjacent depressible areas from one principle button is substantially the same as the spacing distance between two adjacent depressible areas from two separate adjacent principle buttons.

4. A telephony keypad of claim 1, wherein each said principle button is formed having a periphery, and each said tactile depressible area is positioned proximate to said periphery.

5. A telephony keypad of claim 1, wherein each said depressible area of each said button is structurally raised to aid a user with said tactile manipulation.

6. A compact, ergonomic telephony keypad comprising three principle buttons capable of performing twelve distinct electronic switch operations; said three principle buttons being positioned in a group comprising a telephony keypad with each said button formed for tactile manipulation to achieve four of said twelve switch operations, each said button further being formed having four tactile depressible areas positioned thereon around an imaginary central axis, said four tactile depressible areas being spaced about equally apart around the imaginary central axis of each of said principle buttons, the depressible areas of each said button being positionally rotated about 45 degrees relative to the positioning of the depressible areas of an adjacent button, and, said three principle buttons being spaced apart and positioned relative to each other so as to substantially maximize the spacing of said twelve depressible areas, while, substantially minimizing the spacing of said principle buttons.

7. A compact, ergonomic telephony keypad comprising three principle buttons capable of performing twelve distinct electronic switch operations; said three principle buttons being positioned in a group comprising a telephony keypad with each said button formed for tactile manipulation to achieve four of said twelve switch operations, each said button further comprising a group of four tactile depressible areas being spaced about equally apart around an imaginary central axis, and, each said group of four depressible areas of each said button being positionally rotated about 45 degrees relative to the position of an adjacent group of depressible areas of an adjacent button.

8. A telephony keypad of claim 7, wherein the spacing distance between two adjacent depressible areas from one principle button is substantially the same as the spacing distance between two adjacent depressible areas from two separate adjacent principle buttons.

9. A telephony keypad of claim 7, wherein each said principle button is formed being tiltable in four different directions away from said imaginary central axis.

10. A telephony keypad of claim 7, wherein each said principle button is formed having a periphery, and each said tactile depressible area is positioned proximate to said periphery.

11. A telephony keypad of claim 7, wherein each said depressible area of each said button is structurally raised to aid a user with said tactile manipulation.

* * * * *